United States Patent [19]
Benson

[11] Patent Number: 6,070,417
[45] Date of Patent: Jun. 6, 2000

[54] METHOD FOR MAKING SLURRY

[76] Inventor: Robert A. Benson, 13 Commonwealth Ave., Boston, Mass. 02116

[21] Appl. No.: 09/282,022

[22] Filed: Mar. 29, 1999

[51] Int. Cl.[7] ..................................................... A23G 9/00
[52] U.S. Cl. ................................... 62/71; 62/342; 165/94
[58] Field of Search .............................. 62/71, 342, 343; 165/94

[56] References Cited

U.S. PATENT DOCUMENTS

| | | | |
|---|---|---|---|
| 4,287,725 | 9/1981 | Hoenisch | 62/344 |
| 5,617,734 | 4/1997 | Chase et al. | 62/343 |
| 5,890,531 | 4/1999 | Gairns et al. | 165/94 |
| 5,983,994 | 10/1999 | Tsou | 165/94 |

*Primary Examiner*—William E. Tapolcai

[57] ABSTRACT

A source fluid from which solid material forms when it is cooled is passed through apparatus which defines a continuous reentrant lumen. The lumen has a thermally conductive processing wall from which heat is extracted from the outside as the source fluid flows through the lumen, resulting in formation of solid material on the inner surface of the lumen wall. A runner circulates around the lumen and dislodges material deposited on the inner surface of the lumen wall. This material is then carried as solids of a slurry out of the apparatus with the fluid stream.

4 Claims, 2 Drawing Sheets

METHOD FOR MAKING SLURRY

BRIEF SUMMARY OF THE INVENTION

This invention relates to method for forming a slurry. A source fluid from which solid material forms when it is cooled is passed through apparatus which defines a continuous reentrant lumen. The lumen has a thermally conductive processing wall from which heat is extracted from the outside as the source fluid flows through the lumen, resulting in formation of solid material on the inner surface of the lumen wall. A runner circulates around the lumen and dislodges material deposited on the inner surface of the lumen wall. This material is then carried as solids of a slurry out of the apparatus with the fluid stream.

DETAILED DESCRIPTION

Figure 1:
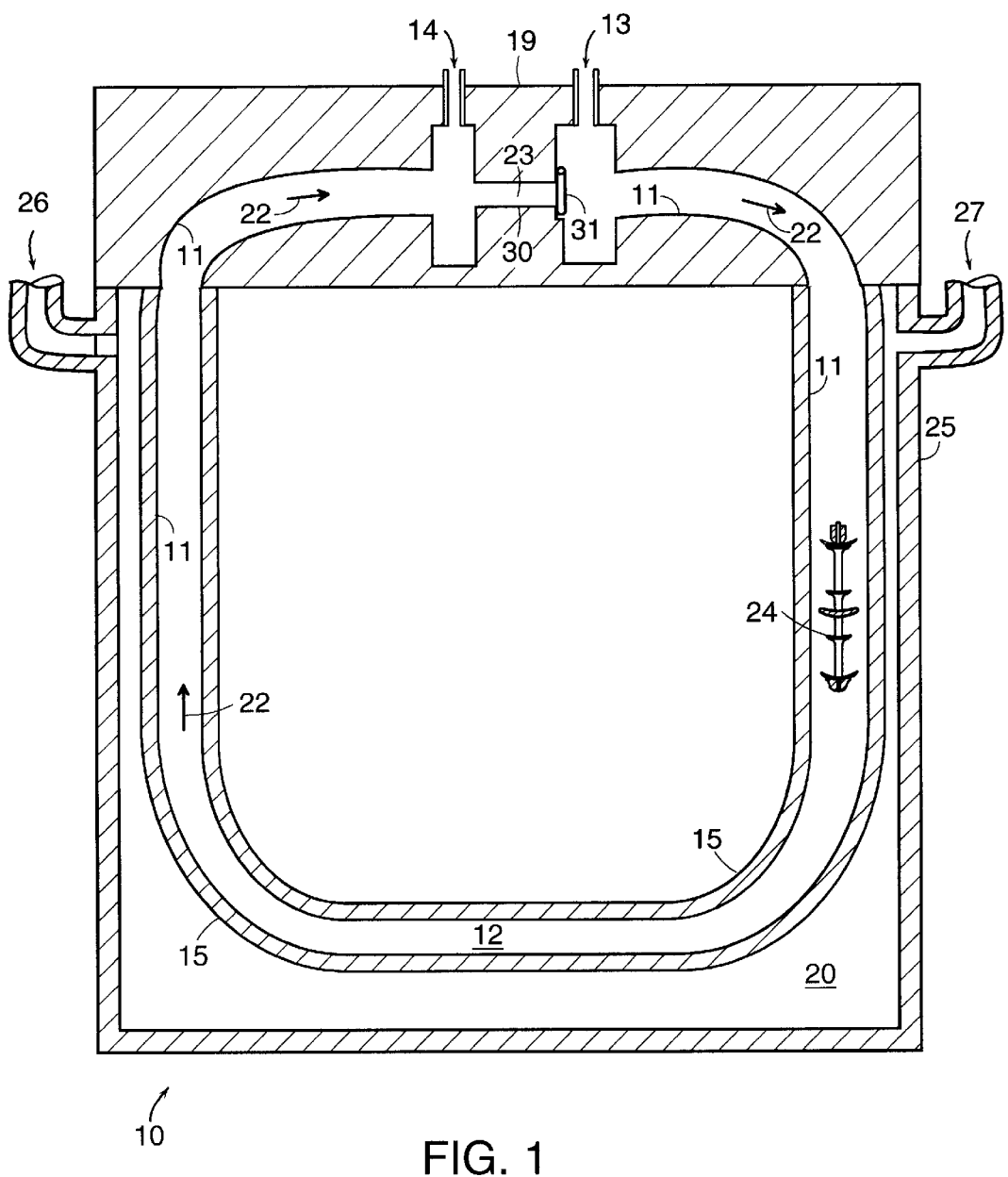
FIG. 1 shows processing apparatus used in practicing the method of the invention

With reference to the Figures, apparatus 10, used in the practice of the invention, includes wall 11 which defines continuous reentrant lumen 12 passing through processing wall 15 and runner return structure 19. Inlet port 13 communicates with lumen 12 as does outlet port 14. A first path 22 passes through lumen 12 from inlet port 13 to outlet port 14. The lumen wall around first path 22 includes heat exchanging portion 15 which is made of thermally conductive material. The lumen 12 within heat exchanging portion 15 is advantageously of uniform cross-section. A shorter path 23 through lumen 12 from inlet port 13 to outlet port 14 is also defined passing only through runner return structure 19.

Runner return structure 19 has a reduced portion 30 in which the cross-section of lumen 12 is less than that in heat exchanging portion 15. Runner return structure 19 also includes a plug mechanism such as check valve 31 which blocks flow from inlet port 13 through second path 23 to outlet port 14.

Heat exchanger containment shell 25 encloses a space 20 around heat exchanging portion 15 of lumen wall 11. Coolant inlet port 26 is connected to admit coolant to space 20 and coolant effluent port 27 is connected to discharge coolant from coolant space 20.

Figure 2:
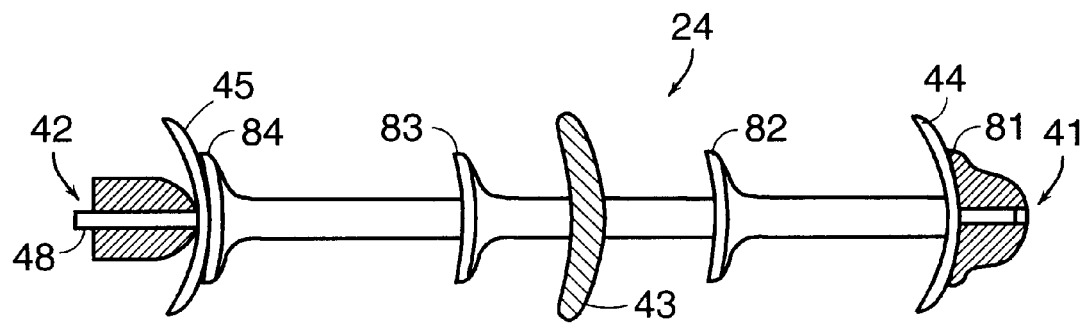
FIG. 2 shows an enlarged view of the runner which is part of the apparatus of FIG. 1.

Wall conditioning runner 24, shown particularly in FIG. 2, is situated within lumen 12 and is free to move independently around the circuit of the lumen. Runner 24 has an elongated form extending from lead end 41 to rear end 42 and includes a wall conditioning element 43, lead entrainment element 44, rear entrainment element 45 and return blocking elements 81, 82, 83, and 84 all affixed on flexible spine 48 running the length of the runner. The wall conditioning element is made of deformable or flexible material permitting it to pass through reduced portion 30.

The distance between lead entrainment element 44 and rear entrainment element 45 is greater than the distance from inlet port 13 to outlet port 14 along path 23. Each of the distances between return blocking element 81 and return blocking element 82, between return blocking element 82 and return blocking element 83, and between return blocking element 83 and return blocking element 84 is less than the length of reduced portion 30.

Figure 3:
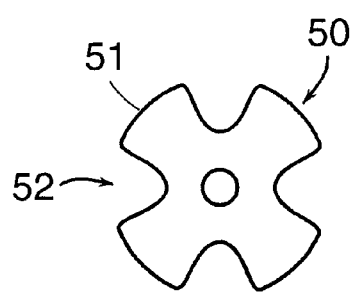
FIG. 3 shows a component of the runner of FIG. 2.

With reference particularly to FIG. 3, entrainment elements 44, 45 may advantageously be constructed from cut-outs 50 cut from flexing metallic or polymeric sheet cut in the form shown in FIG. 4. Two such cut-outs are affixed together centrally with the vanes 51 of one cut-out covering the depressions 52 of the other. This cut out pair is then slipped over spine 48 and clamped against cupped face of return blocking element 81. The cupped face presses against the cut-outs and bends the out-outs backward into a conical shape. The periphery of the assembled structure readily accommodates to a smaller radius as the vanes bend backwards and more extensively overlap one another so that the entrainment elements in their expanded form fill the cross-section of the lumen in path 22 while they assume a compressed form fitting within reduced portion 30 when the runner passes through path 23.

In operation, a coolant fluid is admitted through coolant inlet port, circulates through space 20, and exits through coolant effluent port 27. Fluid from which a solid forms when the fluid is cooled is admitted through inlet port 13 and circulates through lumen 12 along path 22 and out through outlet port 14. Check valve 31 is closed and prevents flow through path 23. Fluid which has entered through inlet port 13 as it circulates along path 22, has heat extracted from it by contact with processing wall 15 which is in turn cooled by the coolant fluid in space 20 which bathes the outside of processing wall 15. As a result of this heat extraction, solids form from the circulating fluid and accumulate on the inside of processing wall 15.

As fluid flows around lumen 12 it sweeps runner 24 along with it. As the runner moves through the lumen within the processing wall, the wall conditioning elements 43 clear accumulated solids from the wall surface so that solids do not build up on the wall but are carried along with the flowing fluid as a slurry When the runner 24 is swept into the return structure 19, lead entrainment element 44 passes across outlet port 14 and enters reduced portion 30, deforming to assume a smaller periphery as it does so. Then the lead end of the runner element continues to advance, pushing open check valve 31, passing across inlet port 13, and entering path 22 of the lumen. It may be noted that advantageously, lead entrainment element 44 enters the upstream end of path 22 before rear entrainment element 45 has left the downstream end of path 22 so that at least one of these entrainment elements is always in path 22 where the flow will sweep it along. It may also be noted that while the runner holds check valve 31 open there is always at least one return blocking element in reduced portion 30 so that a short circuit of flow from inlet port 13 through reduced portion 23 to outlet port 14 is prevented. After the runner has passed through return section 19 it is swept by the flow through another circuit of lumen 12 where it again clears the wall of accumulated solids.

As a specific example of the process according to the invention, water is introduced into inlet port 14 and chilled brine at a temperature below 0 deg C is supplied to coolant inlet port 26. Water ice will form on processing wall 15 and be scraped from the wall into the stream of water by the runner to produce a slurry of ice particles dispersed in water, which is discharged through outlet port 13.

It will be recognized that this method can be used to process a wide range of fluids from which solids form on cooling to produce slurries with such solids suspended in the fluid and also to process fluids from which solids form on heating by circulating a hot fluid through space 20. The selection of the appropriate materials and temperatures for the heat exchange bath will be evident to those skilled in the heat exchange art.

What is claimed is:

1. A method for producing a slurry of solids suspended in a fluid comprising the steps providing apparatus including structure defining a continuous reentrant lumen, said lumen having a wall, an inlet port communicating with said lumen at a first position and an outlet port communicating with said lumen at a second position so that a first path and a second path from the inlet port to the outlet port through the lumen are defined, a return structure situated around said second path, processing wall on which material accumulates during operation of said apparatus, said processing wall being part of said lumen wall and situated along said first path, a runner situated within the lumen and free to move through the lumen, said runner comprising a wall conditioning portion effective as the runner moves along said first path to clear accumulated material from said processing wall, and a plug mechanism effective in blocking flow from said inlet port to said outlet port through said second path, introducing into said inlet port fluid from which solids form on cooling, removing heat from the outside of said processing wall, depositing solid material on the inside of said processing wall, driving said wall conditioning runner around said lumen, dislodging solid material formed on the inside of said processing wall with said runner, and withdrawing from said outlet port a slurry of fluid with solid material suspended therein.

2. A method for producing a slurry of solids suspended in a fluid comprising the steps providing apparatus including structure defining a continuous reentrant lumen, said lumen having a wall, an inlet port communicating with said lumen at a first position and an outlet port communicating with said lumen at a second position so that a first path and a second path from the inlet port to the outlet port through the lumen are defined, a return structure situated around said second path, processing wall on which material accumulates during operation of said apparatus, said processing wall being part of said lumen wall and situated along said first path, a runner situated within the lumen and free to move through the lumen, said runner comprising a wall conditioning portion effective as the runner moves along said first path to clear accumulated material from said processing wall, and a plug mechanism effective in blocking flow from said inlet port to said outlet port through said second path, introducing into said inlet port fluid from which solids form on heating, supplying heat to the outside of said processing wall, depositing solid material on the inside of said processing wall, driving said wall conditioning runner around said lumen, dislodging solid material formed on the inside of said processing wall with said runner, and withdrawing from said outlet port a slurry of fluid with solid material suspended therein.

3. A method as claimed in claim 1 in which the apparatus provided includes a containment shell enclosing a space around said processing wall.

4. A method as claimed in claim 2 in which the apparatus provided includes a containment shell enclosing a space around said processing wall.

* * * * *